Sept. 12, 1967 H. WEISS 3,341,772
DEVICE FOR MEASURING LOCALLY DEPENDENT DIFFERENCES BETWEEN
THE MAGNETIC FIELD GRADIENT AT DIFFERENT
POINTS OF A MAGNETIC FIELD
Filed Oct. 21, 1964

United States Patent Office 3,341,772
Patented Sept. 12, 1967

3,341,772
DEVICE FOR MEASURING LOCALLY DEPENDENT DIFFERENCES BETWEEN THE MAGNETIC FIELD GRADIENT AT DIFFERENT POINTS OF A MAGNETIC FIELD
Herbert Weiss, Nurnberg, Germany, assignor to Siemens-Schuckertwerke Aktiengesellschaft, Berlin-Siemensstadt, Germany, a German corporation
Filed Oct. 21, 1964, Ser. No. 405,486
Claims priority, application Germany, Oct. 26, 1963, S 88,043
14 Claims. (Cl. 324—46)

My invention relates to devices for measuring magnetic field gradients and higher locality-dependent differences of a magnetic field, with the aid of galvanomagnetic semiconductor probes.

The gradient of a magnetic field for a given distance can be measured with galvanomagnetic resistance probes mounted in a fixed space relation to each other. In a spacially variable magnetic field, the respective probes exhibit different electrical resistances so that, with the probes connected in a bridge network, the resulting difference voltages are proportional to the magnitude of the magnetic field gradient. The measuring accuracy is affected by specimen differences of the individual field probes which are not identical with respect to sensitivity relative to magnetic fields and changes in temperature.

Relating to such galvanomagnetic resistance probes of fixed mutual spacing electrically connected in a measuring bridge network, it is an object of my invention to increase the accuracy and reliability of measuring performance.

More specifically, it is an object of my invention to avoid or minimize in such galvanomagnetic resistance devices the measuring errors due to heretofore inevitable specimen differences.

Still another object of the invention is to afford reducing the mutual spacing between the two galvanomagnetic resistance probes of a pair below the minimum distance heretofore obtainable in practice, thus affording an increase in measuring precision as well as the measuring of extremely steep magnetic-field gradients.

It is also an object of my invention to devise a galvanomagnetic probe device suitable for use in narrow air gaps of electrical machines, bore holes or other similarly narrow space, and suitable for measuring magnetic field gradients or differences between magnetic field gradients thereof in any desired direction in space.

A further object of my invention is to eliminate the sources of trouble and inaccuracy resulting from the necessity of using solder and similar junctions between the individual galvanomagnetic resistance probes of a pair.

To achieve these objects, and in accordance with a feature of my invention, I provide a rigid carrier and form the galvanomagnetic resistance probes as well as the means for electrically interconnecting these probes on the carrier from a single integral piece of semiconductor material. Thus the individual probes consist virtually of identical material and have the same sensitivity with respect to magnetic fields and changes in temperature.

For producing a device according to the invention, two or more probes are cut or otherwise shaped out of one and the same layer or wafer of semiconductor material in such a manner that conducting bridging pieces of semiconductor material remain preserved between the individual probes.

As a result, solder junctions between the probes of a pair are avoided, and a multiple probe can be produced at approximately the same manufacturing cost as a single probe. This can be achieved, for example, by etching the shape of the semiconductor from the layer or wafer with the aid of the photoresist technique conventional in the production of electronic semiconductor devices, or by cutting the desired semiconductor shape out of the wafer or layer with the aid of ultrasonic treatment.

According to another feature of my invention, these bridging portions of the semiconductor material are preferably metallized on the surface with good conducting material.

Measuring very steep magnetic field gradients requires giving the individual galvanomagnetic resistance probes an only slight distance from each other. The semiconductor resistance probes, also called "field plates" which form a pair in a device according to the invention and are preferably arranged in parallel relation to each other, can be given a spacing which, depending upon the particular measuring purpose, can be readily reduced down to about 10μ. Such small spacings are not even approximately attainable with separately produced individual probes because it is too difficult to give separate probes the required parallel orientation. Magnetic field gradient measuring devices according to the invention, having probe pairs of an extremely small width, can be inserted transversely into the narrow air gap of a magnet, i.e. parallel to the magnetic field lines.

For further describing and explaining the invention, reference is made in the following to embodiments illustrated by way of example on the accompanying drawing, in which.

Figure 1:
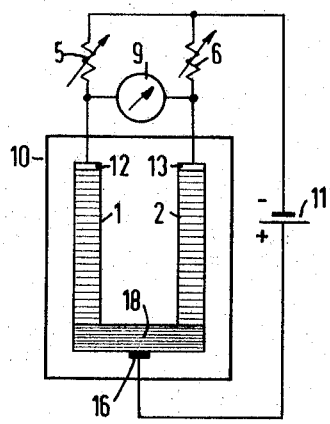
FIG. 1 is a schematic view of an embodiment of a gradient probe of the present invention and the appertaining measuring circuit.

The gradient probe shown in FIG. 1 comprises two strip-shaped galvanomagnetic resistors 1, 2 which extend parallel to each other and have respective adjacent ends electrically interconnected by a bridging piece 18. The probes 1, 2 and the bridging piece 18 consist of a single U-shaped layer of semiconductor material upon the planar surface of a carrier plate 10 consisting of magnetically and electrically insulating material such as ceramic. Suitable, for example, is sintered alumina. Glass is likewise applicable. The carrier may have a thickness of 1 mm. or less. The connecting contacts 12, 13 and 16 at the free ends of the respective probes 1, 2 and at the center of the bridge piece 18 are soldered or alloyed to the semiconductor layer.

Current from a source 11 passes through contact 16 in bridge piece 18 and thence through the two probes 1 and 2 and respective ohmic resistors 5 and 6 back to the source 11. A voltage measuring instrument 9 is connected in the output diagonal of the bridge network thus formed. For calibrating the device, the probe is placed in a homogeneous magnetic field and the resistors 5 and 6 are so adjusted that the instrument 9 is not traversed by current and shows zero voltage. When thereafter the probe is placed in an inhomogeneous magnetic field so that the field strength at the respective probes 1 and 2 is different, the bridge network is unbalanced, and the instrument 9 indicates a voltage proportional to the gradient of the field.

Figure 2:
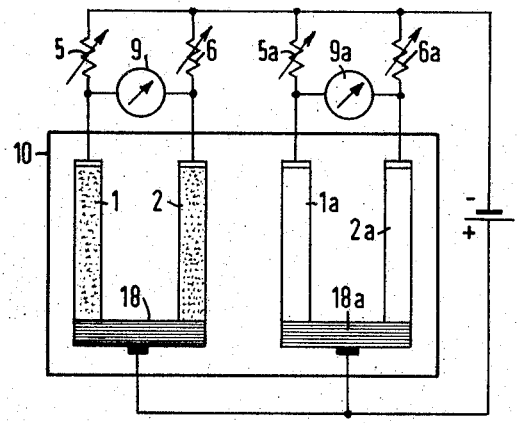
FIG. 2 is a schematic view of an embodiment of a double gradient probe of the present invention and a measuring circuit for determining the difference between the magnetic field gradient at different points of the magnetic field as a function of locality.

The double probe according to FIG. 2 comprises two gradient probes of the type shown in FIG. 1 but mounted on a single carrier plate 10. The two probes 1 and 2 of the first probe pair are interconnected by a bridge piece 18 which consists with probes 1 and 2 of a single integral piece of semiconductor material. The probes 1a and 2a with the interconnecting bridge piece 18a consist of another integral piece of the same semiconductor material. The ohmic resistors 5, 6 and 5a, 6a are calibrated in a homogeneous magnetic field so that both indicating instruments 9 and 9a in the interconnected bridge networks show zero voltages. When the double probe is placed in an inhomogeneous magnetic field, the difference between the deflections of the two instruments 9 and 9a is proportional to the amount of difference between the magnetic field gradient at different points.

Figure 3:
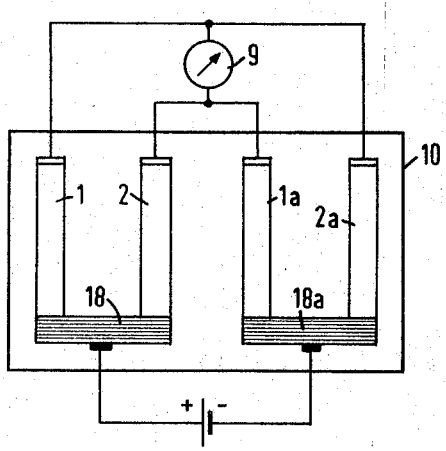
FIG. 3 is a schematic view of another embodiment of the double gradient probe of the present invention and an appertaining circuit.

The double gradient probe shown in FIG. 3 is similar to that of FIG. 2, and may be understood to result from FIG. 1 by replacing the ohmic resistors 5 and 6 in FIG. 1 by the magnetic-field responsive probes 1a and 2a with the interconnecting bridging piece 18a. The probe pair 1a, 2a and the probe pair 1, 2 are supported on a single carrier plate 10. When such a field probe is located in a magnetic field having a specially constant gradient, the sum of the resistances of probes 1 and 2a is constant and the resistance sum of respective probes 2 and 1a is likewise constant. Only when the difference between magnetic field gradients, relative to locality of the magnetic field differs from zero, will the instrument 9 show a value proportional to such difference between the magnetic field gradient at different points.

Figure 4:
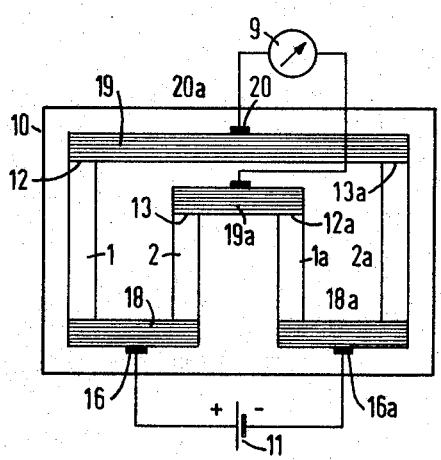
FIG. 4 is a schematic view of another embodiment of the double gradient device of the present invention in which all of the semiconductor components consist of a single integral piece.

The probe according to FIG. 4 is an improvement over the one shown in FIG. 3. The contacts 12 and 13a of probes 1 and 2a (FIG. 4) as well as the contacts 13 and 12a of probes 2 and 1a are no longer interconnected by wires outside of the probe device proper. In lieu thereof the respective ends of the probes are interconnected by bridging pieces 19 and 19a consisting of the same semiconductor material as the probes themselves. The entire field probe forming a strip layer upon the top surface of the carrier plate 10, thus consists of a single piece of semiconductor material which comprises the probes 1, 2, 1a, 2a as well as all interconnecting bridging pieces 18, 18a, 19 and 19a. Consequently, all solder or similar junctions at the interconnection of probes are avoided. Such a field probe, cut or otherwise shaped of a single piece of semiconductor material, affords the utmost reliability in having all of its components consist of identical material with the same sensitivity with respect to magnetic fields and changes in temperature. Furthermore, the probe according to FIG. 4 has only four external leads, namely two leads for supplying voltage from the source 11 and two for connecting the measuring instrument 9. Suitable solder or alloying contacts 16, 16a, 20 and 20a are provided for this purpose. However, in this embodiment as well as in all of those described with reference to FIGS. 1 to 3, the conducting bridging pieces 18 and 18a or 19 and 19a may be metallized by good conducting material for the purpose of reducing the electrical resistance of these connecting bridges and facilitating the attachment of the wires. In the latter case the wires may also be attached by thermocompression. The metallization in FIGS. 1 to 4 is indicated by horizontal hatching of the conducting bridge pieces.

Particularly suitable as material for the galvanomagnetic resistance probes are semiconductor substances of a high charge-carrier mobility, preferably $A^{III}B^V$ compounds. I have found indium antimonide to be best suitable. For obtaining a high sensitivity of the galvanomagnetic resistance probes by securing the highest possible resistance changes in response to magnetic field variations, good electrically conductive strips may be placed in parallel upon the surface of the probes (1, 1a, 2, 2a). Such strips are schematically indicated in FIG. 1 by horizontal lines on the semiconductor resistance probes 1 and 2. The probes then are particularly sensitive to the magnetic field component perpendicular to the surface plane of the carrier plate 10. The strips may consist of silver or indium and are preferably deposited electrolytically. They correspond to those more fully described and explained in U.S. Patent 2,894,234 of H. Weiss and H. Welker, assigned to the assignee of the present invention.

However, instead of attaching good conducting strips upon the surface of the semiconductor probes, the semiconductor layers may also be provided with geometrically anisotropic and parallel oriented inclusions of good conducting material, particularly nickel antimonide (NiSb). I have found it preferable to use semiconductor probes of indium antimonide with embedded needle-shaped inclusions of NiSb. The production, properties and effects of such inclusions are more fully described in the copending application of H. Weiss and M. Wilhelm, Serial No. 273,776, filed April 17, 1963, which is now United States Patent No. 3,226,225, issued December 28, 1965, assigned to the assignee of the present invention. The inclusions are to extend perpendicularly to the longitudinal direction of the elongated semiconductor probes, and they are oriented either in parallel relation to the carrier plate of the probe or perpendicularly to the surface of the plate. Probes made of such material may have a strip width of about $50\mu$, a thickness of 20 to $30\mu$, and an individual length of several hundred microns depending upon the resistance desired. As a rule, the needle-shaped NiSb inclusions, amounting to 1.8% by weight of the embedding InSb material, have a thickness of about $1\mu$, a length of 10 to $30\mu$ or more, and are spaced from each other a distance of about 1 to $2\mu$.

If the needle-shaped inclusions are parallel to the surface of the carrier-plate and hence parallel to the plane of the galvanomagnetic resistance probes, their effect is comparable to that of the above-mentioned, subsequently attached surface strips of silver or indium. If the parallel needle-shaped inclusions are oriented perpendicularly to the surface of the carrier plate, the probe will respond to the spacial changes of the magnetic field whose induction is in the surface plane of the carrier plate. This affords using the device for response to gradients in the direction of the magnetic field, whereas probes with needle-shaped inclusions parallel to the plate surface respond especially to gradients of the magnetic induction perpendicular to the direction of the magnetic field. In FIG. 2, the needle-shaped inclusions are schematically indicated by dots on probes 1 and 2 in order to indicate that these inclusions extend perpendicularly to the surface plane of the carrier plate 10.

Field probes of both types, namely those having needle-shaped inclusions parallel to the carrier surface and those having inclusions perpendicular to the surface, can both to given such minute spacial dimensions as to be insertable into the narrow air gap of a magnet with the surface plane of the carrier plate parallel or even perpendicular to the narrow gap. This, for example, affords turning the field probes in the gap for measuring field gradients in all directions relative to the magnetic field in an accurate and simple manner.

I claim:

1. A device for measuring the locality-dependent difference between the magnetic field gradient at different points of a magnetic field, said device comprising a rigid carrier, two pairs of galvanomagnetic probes fixedly mounted on said carrier in spaced relation to each other, each probe of each of said pairs of probes having two spaced opposite ends, each of said pairs of probes having connecting means of semiconductor material connecting one of the ends of each of the probes with the corresponding end of the other of the probes, said two probes and said connecting means of each of said pairs of probes being formed of the same semiconductor material and consisting of a single integral piece, and electrical meter having a pair of input terminals, one of said input terminals being electrically connected to the other of the ends of one of the probes of one pair of probes and to the other of the ends of one of the probes of the other pair of probes, the other of said input terminals being electrically connected to the other of the ends of the other of the probes of said one pair of probes and to the other of the ends of the other of the probes of said other pair of probes, and voltage supply means electrically connected to the connecting means of each of said pairs of probes.

2. A device for measuring the locality-dependent difference between the magnetic field gradient at different points of a magnetic field, said device comprising a rigid carrier, two pairs of galvanomagnetic probes fixedly mounted on said carrier in spaced relation to each other, each probe of each of said pairs of probes having two spaced opposite ends, each of said pairs of probes having first connecting means connecting one of the ends of each of the probes with the corresponding end of the other of the probes, second connecting means electrically connecting the other of the ends of one of the probes of one pair of probes to the other of the ends of one of the probes of the other pair of probes and third connecting means electrically connecting the other of the ends of the other of the probes of said one pair of probes and the other of the ends of the other of the probes of said other pair of probes, said two pairs of probes and said first, second and third connecting means being all formed of a single integral piece of semiconductor material, an electrical meter electrically connected to the second and third connecting means, and voltage supply means electrically connected to the first connecting means of each of said pairs of probes.

3. A device as set forth in claim 1, said carrier having a flat surface, and said probe-forming pieces of semiconductor material consisting substantially of U-shaped layers of galvanomagnetic $A^{III}B^V$ semiconductor compound upon said flat surface, the two legs of each U-shape constituting said respective probes, and the bight portion of U-shape constituting said connecting means.

4. A device as set forth in claim 3, said semiconductor material consisting of indium antimonide (InSb) and having mutually spaced and distributed members of metallic conductance extending substantially parallel to the carrier surface and transverse to the longitudinal direction of said probes.

5. A device as claimed in claim 1, wherein said probes are parallel to each other.

6. A device as claimed in claim 1, wherein said probes are of elongated configuration and are of substantially equal dimensions.

7. A device as claimed in claim 1, wherein said probes are parallel to each other and extend substantially perpendicularly from said connecting means.

8. A device as claimed in claim 1, wherein said probes include parallel aligned areas of good electrical conduction.

9. A device as set forth in claim 2, said carrier having a flat surface, and said probe-forming piece of semiconductor material consisting substantially of a layer of galvanomagnetic $A^{III}B^V$ semiconductor compound upon said flat surface, said respective probes and connecting means being included in said layer.

10. A device as set forth in claim 9, said semiconductor material consisting of indium antimonide (InSb) and having mutually spaced and distributed members of metallic conductance extending substantially parallel to the carrier surface and transverse to the longitudinal direction of said probes.

11. A device as claimed in claim 2, wherein said probes are parallel to each other.

12. A device as claimed in claim 2, wherein said probes are of elongated configuration and are of substantially equal dimensions.

13. A device as claimed in claim 2, wherein said probes are parallel to each other and extend substantially perpendicularly from said connecting means.

14. A device as claimed in claim 2, wherein said probes include parallel aligned areas of good electrical conduction.

References Cited
UNITED STATES PATENTS

| | | | |
|---|---|---|---|
| 2,894,234 | 7/1959 | Weiss et al. | 338—32 |
| 3,271,664 | 9/1966 | Mountz et al. | 324—40 |

FOREIGN PATENTS

| | | |
|---|---|---|
| 661,493 | 4/1963 | Canada. |
| 659,653 | 10/1951 | Great Britain. |
| 687,236 | 2/1953 | Great Britain. |
| 759,047 | 10/1956 | Great Britain. |
| 822,210 | 10/1959 | Great Britain. |
| 868,765 | 5/1961 | Great Britain. |

RUDOLPH V. ROLINEC, *Primary Examiner.*

RICHARD B. WILKINSON, WALTER L. CARLSON, *Examiners.*

R. J. CORCORAN, *Assistant Examiner.*